(12) United States Patent
Heurich et al.

(10) Patent No.: US 11,290,282 B2
(45) Date of Patent: *Mar. 29, 2022

(54) FACILITATING DYNAMIC END-TO-END INTEGRITY FOR DATA REPOSITORIES IN AN ON-DEMAND SERVICES ENVIRONMENT

(71) Applicant: salesforce.com, inc., San Francisco, CA (US)

(72) Inventors: Shiloh Cory Heurich, San Francisco, CA (US); Frank Siebenlist, Los Gatos, CA (US); Taher Elgamal, San Francisco, CA (US); Clayten Tyler Joseph Hamacher, Vancouver (CA); Matthew Steele, Oakland, CA (US); Pathik Ashok Solanki, San Francisco, CA (US); Matthew B. Schechtman, Fairfax, VA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,924

(22) Filed: Nov. 25, 2019

(65) Prior Publication Data

US 2020/0235940 A1    Jul. 23, 2020

Related U.S. Application Data

(63) Continuation of application No. 14/485,340, filed on Sep. 12, 2014, now Pat. No. 10,491,398.

(51) Int. Cl.
    *H04L 9/32*      (2006.01)
    *H04L 29/06*     (2006.01)

(52) U.S. Cl.
    CPC ............ *H04L 9/3247* (2013.01); *H04L 63/08* (2013.01); *H04L 63/12* (2013.01)

(58) Field of Classification Search
    USPC .......................................... 713/156
    See application file for complete search history.

(56) References Cited

U.S. PATENT DOCUMENTS 5,577,188 A    11/1996  Zhu
5,608,872 A     3/1997  Schwartz et al.
(Continued)

FOREIGN PATENT DOCUMENTS

WO    2008058123 A2    5/2008

OTHER PUBLICATIONS

Final Office Action for U.S. Appl. No. 14/485,340 dated Apr. 6, 2017, 11 pages.
(Continued)

*Primary Examiner* — Sakinah White Taylor
(74) *Attorney, Agent, or Firm* — Kwan & Olynick LLP

(57) ABSTRACT

In accordance with embodiments, there are provided mechanisms and methods for facilitating dynamic end-to-end integrity for data repositories in an on-demand services environment, where a database system-implemented method includes receiving, by the database system, a content file and metadata to be submitted to a data repository of the database system. The content file may include content, where the metadata may include identifying data associated with at least one of the content and a user associated with the content. The method may include verifying, by the database system, the identifying data of the metadata. The verification of the identifying data represents authentication of at least one of the user and the content. The method may include submitting, by the database system, the content file and the metadata to the data repository, upon authentication of at
(Continued)

least one of the user and the content via successful verification of the identifying data.

18 Claims, 7 Drawing Sheets

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,757,915 A | 5/1998 | Aucsmith et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,021,491 A | 2/2000 | Renaud |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,341 B1* | 5/2001 | Riggins ............... H04L 63/06 380/277 |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,963,561 B1* | 11/2005 | Lahat ................ H04L 69/16 370/356 |
| 7,289,976 B2 | 10/2007 | Kihneman et al. |
| 7,340,411 B2 | 3/2008 | Cook |
| 7,620,655 B2 | 11/2009 | Larsson et al. |
| 8,775,321 B1 | 7/2014 | Mooneyham |
| 9,575,979 B1* | 2/2017 | McClintock ........ G06F 16/152 |
| 2001/0044791 A1 | 11/2001 | Richter et al. |
| 2002/0002468 A1 | 1/2002 | Spagna et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0066172 A1 | 3/2005 | Vorbruggen et al. |
| 2005/0091098 A1 | 4/2005 | Brodersen et al. |
| 2005/0246282 A1 | 11/2005 | Naslund et al. |
| 2007/0055689 A1 | 3/2007 | Rhoads et al. |
| 2007/0277245 A1 | 11/2007 | Goto et al. |
| 2008/0229099 A1 | 9/2008 | Kim et al. |
| 2009/0177744 A1 | 7/2009 | Marlow et al. |
| 2009/0276333 A1 | 11/2009 | Cortes et al. |
| 2010/0161968 A1* | 6/2010 | Pravetz ............... H04L 9/3247 713/156 |
| 2010/0312810 A1* | 12/2010 | Horton ................ G06F 21/10 707/812 |
| 2011/0231645 A1 | 9/2011 | Thomas et al. |
| 2011/0238631 A1 | 9/2011 | Cortes et al. |
| 2014/0007246 A1* | 1/2014 | Nelson ............... H04L 63/0876 726/26 |
| 2014/0304512 A1 | 10/2014 | Kotov et al. |
| 2014/0304693 A1 | 10/2014 | Cipa et al. |
| 2015/0012974 A1* | 1/2015 | Unitt ................... H04L 63/12 726/4 |
| 2015/0135300 A1 | 5/2015 | Ford |

(56) References Cited

U.S. PATENT DOCUMENTS

| | | |
|---|---|---|
| 2015/0271122 A1 | 9/2015 | Jalisatgi et al. |
| 2016/0012427 A1 | 1/2016 | Heerden et al. |
| 2016/0127358 A1 | 5/2016 | Engelking |

OTHER PUBLICATIONS

Final Office Action for U.S. Appl. No. 14/485,340 dated Jun. 14, 2018, 10 pages.
Final Office Action for U.S. Appl. No. 14/485,340 dated May 20, 2016, 16 pages.
Non-Final Office Action for U.S. Appl. No. 14/485,340 dated Dec. 31, 2018, 10 pages.
Non-Final Office Action for U.S. Appl. No. 14/485,340 dated Oct. 22, 2015, 17 pages.
Non-Final Office Action for U.S. Appl. No. 14/485,340 dated Oct. 3, 2017, 12 pages.
Non-Final Office Action for U.S. Appl. No. 14/485,340 dated Sep. 23, 2016, 13 pages.
Notice of Allowance for U.S. Appl. No. 14/485,340 dated Sep. 6, 2019, 7 pages.

\* cited by examiner

FACILITATING DYNAMIC END-TO-END INTEGRITY FOR DATA REPOSITORIES IN AN ON-DEMAND SERVICES ENVIRONMENT

CLAIM OF PRIORITY

This application is a continuation of U.S. patent application Ser. No. 14/485,340, entitled "FACILITATING DYNAMIC END-TO-END INTEGRITY FOR DATA REPOSITORIES IN AN ON-DEMAND SERVICES ENVIRONMENT," filed Sep. 12, 2014, now U.S. Pat. No. 10,491,398, with an issue date of Nov. 26, 2019, the contents of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic end-to-end integrity for data repositories in an on-demand services environment.

BACKGROUND

Conventional data storage repository systems are relatively insecure in that they typically employ access control measures that are not entire reliable and once breached, such measures are insufficient in stopping intruders from accessing and modifying contents at the repositories.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
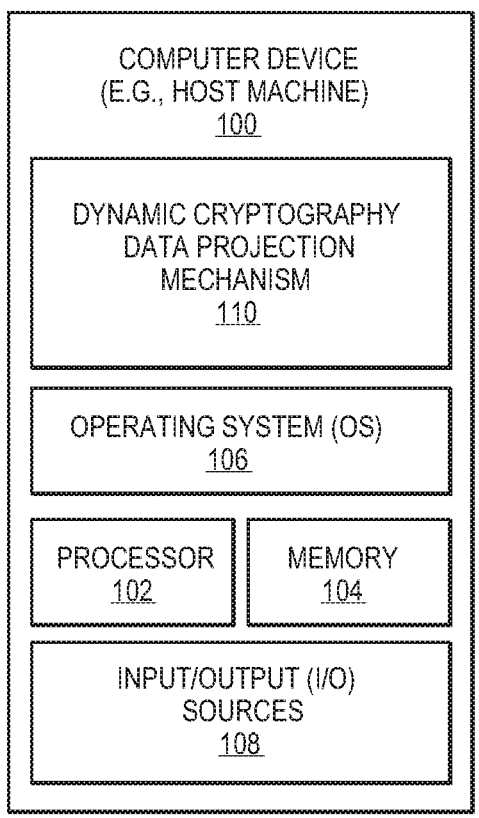
FIG. 1 illustrates a computing device employing a dynamic cryptographic data protection mechanism according to one embodiment.

In accordance with embodiments, there are provided mechanisms and methods for facilitating dynamic end-to-end integrity for data repositories in an on-demand services environment in a multi-tenant environment according to one embodiment. In one embodiment and by way of example, a method includes receiving, by and incorporating into a database system, a content file and metadata to be submitted to a data repository of the database system. The content file may include content, where the metadata incudes identifying data associated with at least one of the content and a user associated with the content. The method may further include verifying, by the database system, the identifying data of the metadata. The verification of the identifying data represents authentication of at least one of the user and the content. The method may further include submitting, by the database system, the content file and the metadata to the data repository, upon successful verification of the identifying data.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic end-to-end integrity for data repositories in an on-demand services environment in an on-demand services environment in a multi-tenant environment according to one embodiment.

Embodiments provide for facilitating end-to-end integrity and stronger guarantees by introducing a novel and innovative cryptographic data protection mechanism for data storage repositories. In one embodiment, a stronger guarantee for data integrity and origination is provided through this novel and innovative cryptographic approach which externalizes the cryptographic data protection mechanism from, and allows implementation independent of, the underlying data repository.

In one embodiment, any combination of any number and type of cryptographic tools may be employed to facilitate an end-to-end integrity and origination guarantee for data objects at any number and type of data repositories. For example, such cryptographic tools may include (without limitation) public key, private key, tamper-proof signature, fingerprint, etc. A data storage repository may include any number and type of repositories for storing any amount and type of data (also referred to as "content"), such as (without limitation) software code, metadata, sales numbers, accounting spreadsheets, legal documents, newspaper articles, books, etc. It is to be noted that throughout the document, "data storage repository" may also be referred to as "storage repository", "data repository", or simply "repository". It is to be noted that embodiments are not limited to any particular number or type of data storage repositories and similarly, embodiments are not limited to any particular amount or type of data or content being stored at such repositories.

Embodiments provide for end-to-end integrity by using a public key/private key cryptography to create a secure and tamper-free signature which includes a fingerprint of the content file and may contain further authorship information, where the content file includes content being maintained at a data storage repository. This signature is unforgeable and tamper-free and can be verified later and the information in the manifest checked against data received from the repository. Further, by maintaining signatures and other metadata in the repository, each file contains the meta-data to verify itself. Any attempt to tamper with a signature or the content it describes may be detected relatively easily by the next user who fetches unsigned, or improperly signed, data.

In one embodiment, one end of the end-to-end integrity path may have a user who is regarded as the producer or developer of content, such as source code, to be assigned to the repository and who strongly authenticates via, for example, a two-factor authentication, where the other end of the end-to-end path may include a consumer who may be another user regarded as a producer/developer or it may be an automated system, such as a build/deploy system. Using this technique, the heterogeneous cryptographic protection system, in one embodiment, may be extended to sign and verify built artifacts, such as executables, with means the other end may be extended to the verifying running code on production machines, such as client computing devices. Moreover, by treating these signatures as the same despite their source, the user/author-related information and integrity may be traced back through deployment to build to test to source to the developer workstation, and by second-factor authentication to the developers themselves, in a single robust system as opposed to manually from one verification system to another verification system, etc.

It is contemplated that embodiments and their implementations are not merely limited to multi-tenant database system ("MTDBS") and can be used in other environment, such as a client-server system, a mobile device, a personal computer (PC), a web services environment, etc. However, for the sake of brevity and clarity, throughout this document, embodiments are described with respect to a multi-tenant database system, such as Salesforce.com®, which is to be regarded as an example of an on-demand environment.

In conventional models, index tables are severely limited in that an index table can only be created, for example, by a limitation of up to two columns and each column with up to three data types. As a result, a large number of index tables and/or skinny tables are required to be created and maintained and further, when they are relied upon for reference (such as when customer queries are to be processed) which can all be expensive, inefficient, and not scalable.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing a dynamic cryptographic data protection mechanism 110 according to one embodiment. In one embodiment, computing device 100 serves as a host machine for employing dynamic cryptographic data protection mechanism ("protection mechanism") 110 for facilitating dynamic end-to-end integrity and origination guarantee for contents at a data repository in a multi-tiered, multi-tenant, on-demand services environment.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of protection mechanism 110 or an organization's representative, such as a salesperson, a sales manager, a product manager, an accountant, a director, an owner, a president, a system administrator, a computer programmer, an information technology (IT) representative, etc.

It is to be noted that any references to software codes, data and/or metadata (e.g., Customer Relationship Model (CRM)

data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ (PaaS), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion® Limited, now known and trading as BlackBerry®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™ systems, etc.), e-readers (e.g., Kindle® by Amazon.com®, Nook® by Barnes and Nobles®, etc.), Global Positioning System (GPS)-based navigation systems, cable setup boxes, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", and "software package" may be used interchangeably throughout this document. Moreover, terms like "job", "input", "request" and "message" may be used interchangeably throughout this document.

Figure 2:
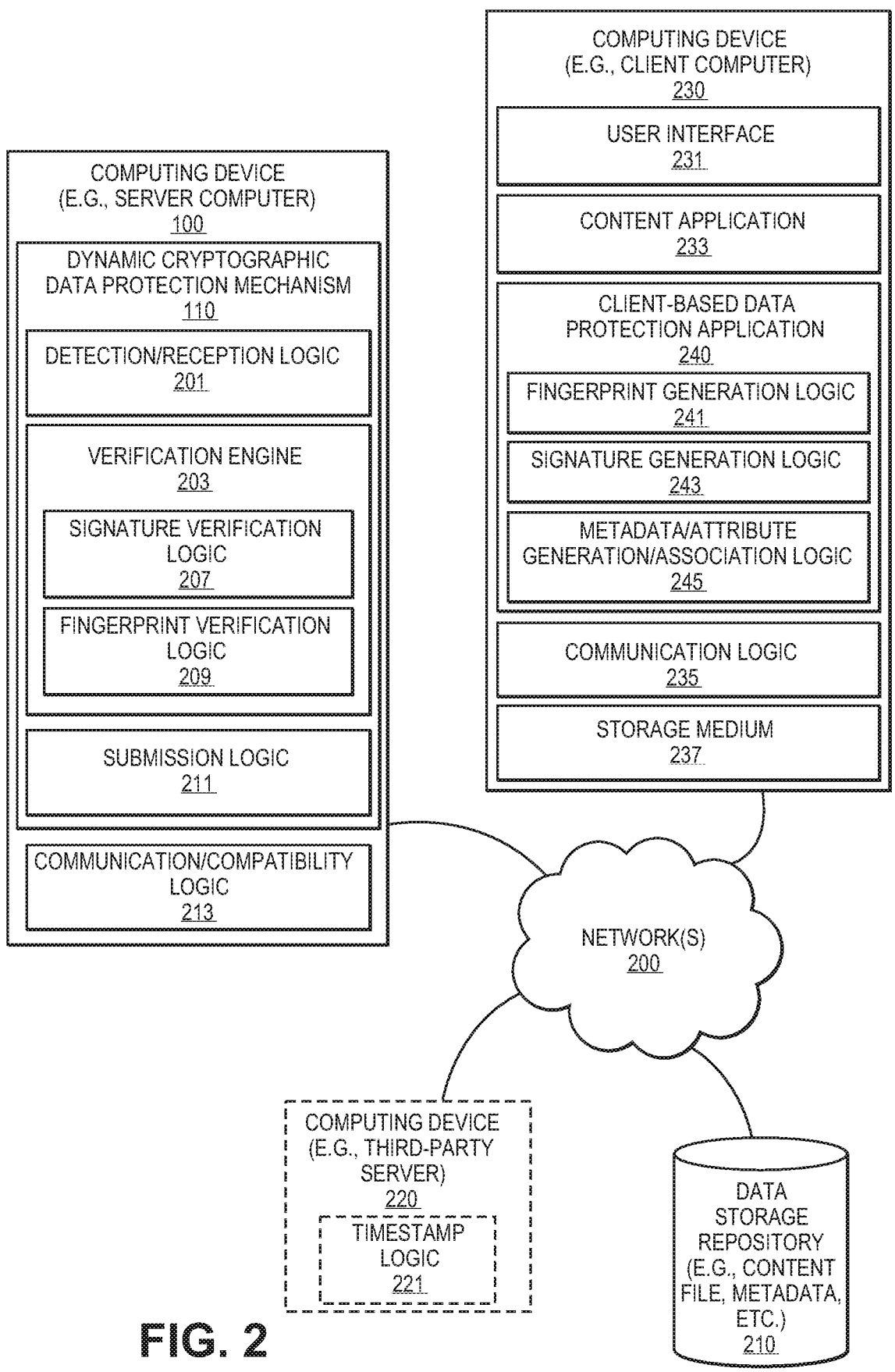
FIG. 2 illustrates a dynamic cryptographic data protection mechanism according to one embodiment.

FIG. 2 illustrates a dynamic cryptographic data protection mechanism 110 according to one embodiment. In one embodiment, protection mechanism 110 may include a number of components, such as (without limitation): detection/reception logic 201, verification engine 203, signature verification logic 207, fingerprint verification logic 209, submission logic 211, and communication/compatibility logic 213. In one embodiment, protection mechanism 110 may be employed by a host machine, such as computing device 100, including any number and type of computing devices, such as server computers or client computers including desktop computers, portable or mobile computers, such as laptop computers, tablet computers, smartphones, etc. Computing device 100 may be in communication with one or more storage repositories, such as data storage repository ("repository") 210, locally or over one or more networks, such as network(s) 200 (e.g., cloud network, Internet, proximity network, intranet, etc.). It is contemplated that data storage repository 210 may be locally or remotely located.

Computing device 100 may be in communication with any number and type of other computing devices over network 200, such as computing device 230 which may include (without limitation) any number and type of workstations, desktop computers, laptop computers, mobile computers, etc. As illustrated, in one embodiment, computing device 230 may host client-based data protection application ("protection application") 241 which may include any number and type of components, such as (without limitation) fingerprint generation logic 241, signature generation logic 243, metadata/attribute generation/association logic ("metadata logic") 245, etc. Computing device 230 may further include (without limitation) user interface 231, content application 233 (e.g., code development application, word processing application, graphics application, etc.), communication logic 235, storage medium 237, etc.

In one embodiment, computing device 100 may be further in communication with one or more third-party or external computing devices, such as third-party server computer 220, over network 200 and/or via one or more protocols, such as Extensible Markup Language Advanced Electronic Signatures ("XAdES") protocol, etc., for issuing and associating electronic timestamps to content files having contents generated at client computer 230.

Throughout this document, terms like "logic", "component", "module", "framework", and "engine" may be referenced interchangeably and include, by way of example, software, hardware, and/or any combination of software and hardware, such as firmware. Further, any use of a particular brand, word, or term, such as "cryptography", "public key", "private key", "signature", "fingerprint", "repository", "code" or "software code", "end-to-end integrity", "cryptographic protection", "hash", "alpha-numeric", "index", "data type", "column", "row", "table", etc., should not be read to limit embodiments to software or devices that carry that label in products or in literature external to this document.

As aforementioned, embodiments are not limited to any particular type of data storage repositories or any particular amount and type of contents stored at such repositories. However, as an example and for the sake of brevity, clarify, and ease of understanding, throughout the document, repository 210 may be regarded as a data storage repository for storing and maintaining, for example, software codes.

For example, and in one embodiment, a user, such as a software developer, may want to create a software code at computing device 230 and assign it to repository 210 for storage. It is contemplated that initially, the user may attempt to log into the system at computing device 230 using initial control access information, such as user identification ("userID"), password, etc. Upon successful verification of the user, the user may be allowed to access content application 233 (e.g., software development application) via, for example, user interface 231 to generate new content, such as software code, where the software code is then regarded as or placed into a content file which is then to be assigned and submitted to repository 210. In some embodiments, the user may simply wish to view some of the existing content in which case, in one embodiment, the various data protection processes as facilitated by protection mechanism 110 and/or protection application 240 may be skipped and the user may be allowed to view the content upon initial credential verification.

It is contemplated that in some embodiments, the user may want to modify the existing content, but content modification may be put through the same data protection processes as content creation and thus, throughout this document, for brevity and clarity, creation of content is referenced and may be regarded as synonymous to modification of content. Similarly, it is contemplated that in some embodiments, the user may wish to delete some of the existing content. As will be further described in this document, like creation and modification of content, any deletion of content may also facilitate generation of a content file, a metadata/attribute file, etc., to be submitted to repository 210 and put through various other data protection processes as facilitated by protection mechanism and application 110, 240. This creation and maintenance of content files and metadata (serving as attributes to the content files) despite whether the content is being created, modified, or deleted, etc., may be used as user/content audit trails for auditing purposes, as necessitated or desired.

In one embodiment, upon generating a content file having the new content, a third-party computer 220 belonging to a third-party system or service provider may be employed to use timestamp logic 221 to timestamp the content and/or content file upon its generation by the user via content application 233. Information such as this (e.g., timestamp) along with any amount and type of other attributes and information, such as authorship data, relating to the user (who is the author) of the content may be obtained to be made part of, for example, metadata/attribute file by metadata logic 245 as will be further described later in this document. Examples of authorship data may include (without limitation) name of the user/author, identifying data (e.g., mother's maiden name, last four digits of social security number, etc.), time and place (e.g., city) of authorship, internet protocol ("IP") number relating to computing device 230, userID, password, employee number, etc. The authorship data be received from the user and/or retrieved from storage medium 237 at computing device 230.

In one embodiment, upon generation of the new content via content generation application 233, fingerprint generation logic 241 is triggered to generate a fingerprint and associated it with the new content. For example, and in one embodiment, the fingerprint may be generated using secure hashing as provided by a hash algorithm and, for example, the fingerprint may include (without limitation) portions of the newly-generated content, such as a number and type of vowels representing a pattern of vowels (e.g., a 64-letter string, etc.) that is obtained from and matched to the new content itself. It is contemplated that fingerprint generation logic 241 may employ a hash calculation module representing any number and type of hash calculation techniques or algorithms for generating hash values to be used to generate fingerprints.

In one embodiment, upon generating a fingerprint using fingerprint generation logic 241, a signature may be generated and associated with the user by signature generation logic 243. For example, and in one embodiment, signature generation logic 243 generate the signature and associates it with the user via, for example, a private cryptographic key ("private key") associated with the user and corresponding to a public cryptographic key ("public key") which may then be used to verify the user and their possession of the private key. As will be further described with reference to signature verification logic 207, this signature of the user may be verified, using the user's public key, proving the user's possession of the private key. It is contemplated that the public key may be stored and maintained at one or more databases along with any number of other public keys corresponding to other private keys associated with other users.

In one embodiment, the fingerprint, the signature, and any relevant authorship data, etc., may then place in metadata (also referred to as "metadata/attribute file" or simply "attribute file") which is associated with and serves as an attribute to the content file. Stated differently, the content file may contain the newly-generated content, but the metadata serving as its attribute may contain all the other relevant data that may be used by protection mechanism 110 to verify and authenticate the user as well as the generated content (which is to be submitted to repository 210) to be able to provide an end-to-end integrity relating to the access and use of repository 210.

Referring now to protection mechanism 110 being hosted by computing device 110, in one embodiment, detection/reception logic 201 may be used to retrieve the signature and fingerprint from the metadata. For example, and in one embodiment, the content file and/or the metadata may be received or detected by detection/reception logic 201 via communication logic 237 and communication/compatibility logic 213 over network 200. Upon having access to the metadata, detection/reception logic 201 may then detect and extract the signature associated with the user and the fingerprint associated with the content from the metadata. The signature and the fingerprint are then forwarded on to signature verification logic 207 and fingerprint verification logic 209, respectively, of verification engine 203 for verification purposes.

In one embodiment, signature verification logic 207 verifies the signature of the user, using the user's public key, proving the user's possession of the corresponding private key. Similarly, in one embodiment, fingerprint verification logic 209 verifies the fingerprint associated with the content file by deciphering the content of the fingerprint and matching it against the content generated by the user and contained within the content file. For example, as aforementioned, the signature may contain fingerprint values generated using a hash algorithm.

It is contemplated that in some embodiments, public and private keys, signatures, fingerprints, etc., may be generated using any number and type of algorithms (e.g., cryptographic algorithm). For example, public/private keys may be generated using a cryptographic algorithm, such as Diffie-Hellman key exchange, etc., and similarly, signatures may be generated using a signature algorithm, such as Digital Signature Algorithm, etc., while some algorithms (e.g., Rivet, Shamir and Adleman ("RSA"), etc.) may be used for performing multiple or global functions, such as generating and maintaining keys, signatures, and fingerprints, etc. It is contemplated that embodiments are not limited to any particular cryptography-related forms or standards (e.g., GNU Privacy Guard ("GPG" or "GnuPG"), Pretty Good Privacy ("PGP"), etc.). Typically, a public or private key may include a long string of alpha-numeric and other characters, appearing as gibberish to the human eye. For example, a Pretty Good Privacy ("PGP")-based private/public key may appear as follows: mQINBFPOzTUBEADT1kIEMY1Ix+ 9DyNfGHE9HPjLSI/Ybnsn/bbx8cWmeAktoYjBS . . . YyyyH5jej2NP0FuP9jjl8eYgSZl9tqaU6Y9vDyXzE0h6-F4SUPiBx3hEIrVzFJym0.

Similarly, as aforementioned, a signature may also include a long string of alpha-numeric and other characters and appear as follows: iEYEARECAA-YFAjdYCQoACgkQJ9S6ULt1dqz6IwCfQ7wP6i/i8HhbcOSKF4ELyQB1oCoAoOuq pRqEzr4kOkQqHRLE/b8/Rw2k=y6kj.

In one embodiment, once the signature and fingerprint are verified, the integrity of the user and their content is also determined to be verified. Accordingly, upon such verification, both the content file and its attribute file (e.g., the metadata) are ready to be submitted to repository 210. In one embodiment, submission logic 211 submits the content and metadata to repository 210 for storage, maintenance, and future access by the user or other users.

Communication/compatibility logic 213 may facilitate the ability to dynamically communicate and stay configured with any number and type of software/application developing tools, models, data processing servers, database platforms and architectures, programming languages and their corresponding platforms, etc. Communication/compatibility logic 213 further facilitates the ability to dynamically communicate and stay configured with various computing devices (e.g., server computing device, mobile computing devices, such as smartphones, tablet computers, laptop, etc.), databases, repositories, networks (e.g., cloud network, intranet, the Internet, proximity network, such as Bluetooth®, WiFi®, etc.), websites (e.g., social networking websites, such as Facebook®, LinkedIn®, Google+®, Twitter®, etc.), and the like, while ensuring compatibility with changing technologies, parameters, protocols, standards, etc.

It is contemplated that any number and type of components may be added to and/or removed from protection mechanism 110 to facilitate various embodiments including adding, removing, and/or enhancing certain features. For brevity, clarity, ease of understanding, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
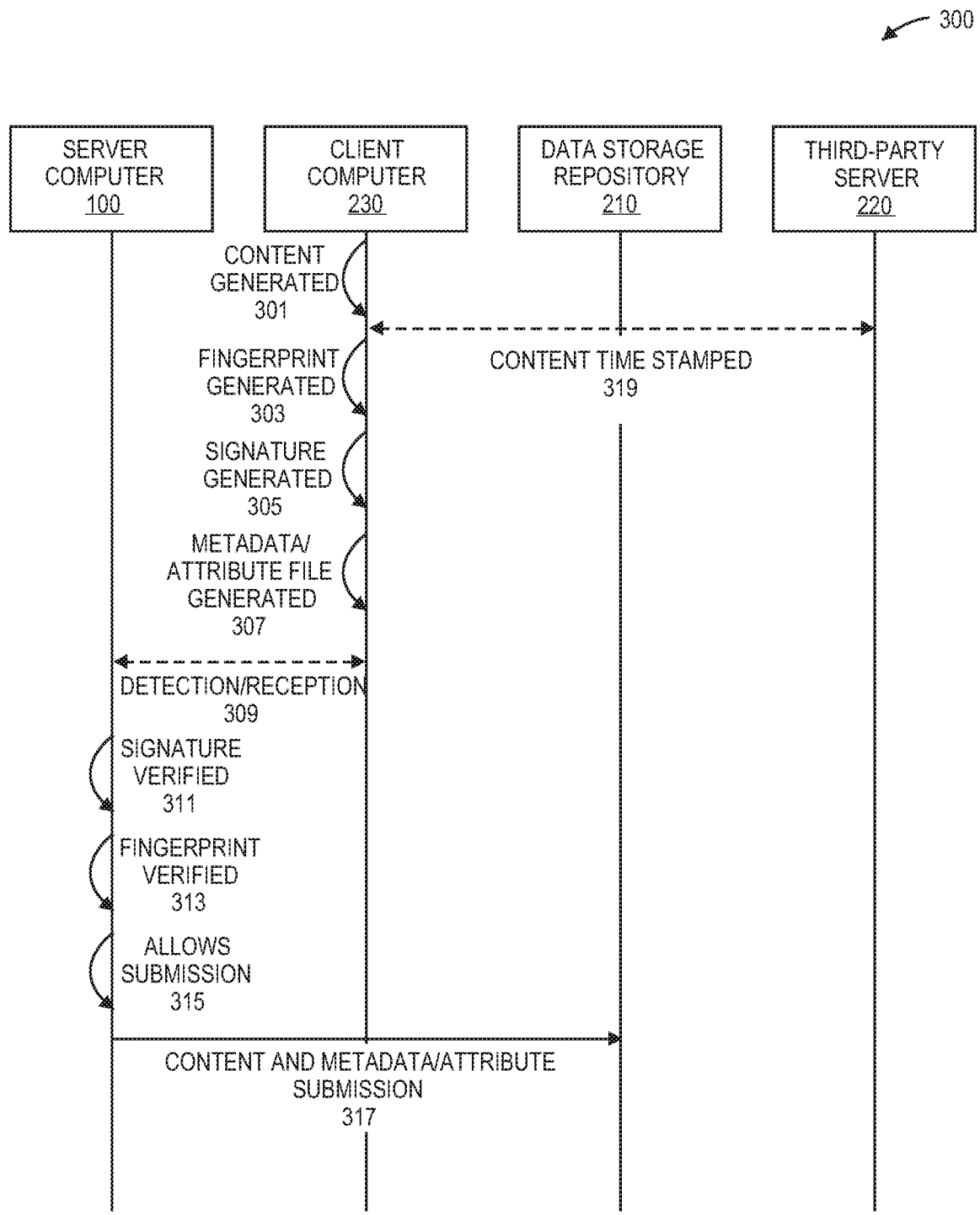
FIG. 3 illustrates a transaction sequence for facilitating dynamic end-to-end integrity for data repositories according to one embodiment.

FIG. 3 illustrates a transaction sequence 300 for facilitating dynamic end-to-end integrity for data repositories according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by protection mechanism 110 and protection application 240 of FIG. 2. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated hereafter.

Transaction sequence 300 begins with generation of content 301 (e.g., source code) by a user at client computer 230, where the content represents or is placed into a content file which is to be assigned and submitted to data storage repository 210. In one embodiment, upon generation of the content, at third-party server computer 220, a timestamp indicating generation of the content may be generated 319 and associated with the content/content file. As described with reference to FIG. 2A, a fingerprint identifying the content may be generated 303 based on the content (e.g., using hash algorithm and portions of the content, etc.). The fingerprint may then be associated with the content/content file to identify the content. In one embodiment, a signature identifying the user (e.g., author of the content) may be generated 307 using public/private keys associated with the user. The signature may then be associated with the user to identify the user. In one embodiment, metadata is generated 307 in which the signature, the fingerprint, and any other authorship data (e.g., user's name, identification number, etc.) may be placed. This metadata is associated with the content file and serves as the content file's attribute.

In one embodiment, at server computer 100, the content and metadata may be detected or received 309 by protection mechanism 110 of FIG. 2A for further processing. Upon accessing the metadata, the signature and the fingerprint are retrieved to be verified. In one embodiment, the signature associated with the user is verified 311 based on the user's public key, proving the user's possession of the private key associated with the user and thus, the signature is verified to identify and authenticate the user. In one embodiment, the fingerprint associated with the content file is verified 313 by, for example, verifying any hash value associated with the fingerprint and/or decoding the fingerprint to decipher the content and thus, the fingerprint is verified to identify and authenticate the content. In one embodiment, upon verification of the signature and fingerprint, the content file and its attribute, the metadata, may be allowed 315 to be submitted to the data storage repository 210. In one embodiment, the content and metadata are submitted 317 to the repository 210.

Figure 4:
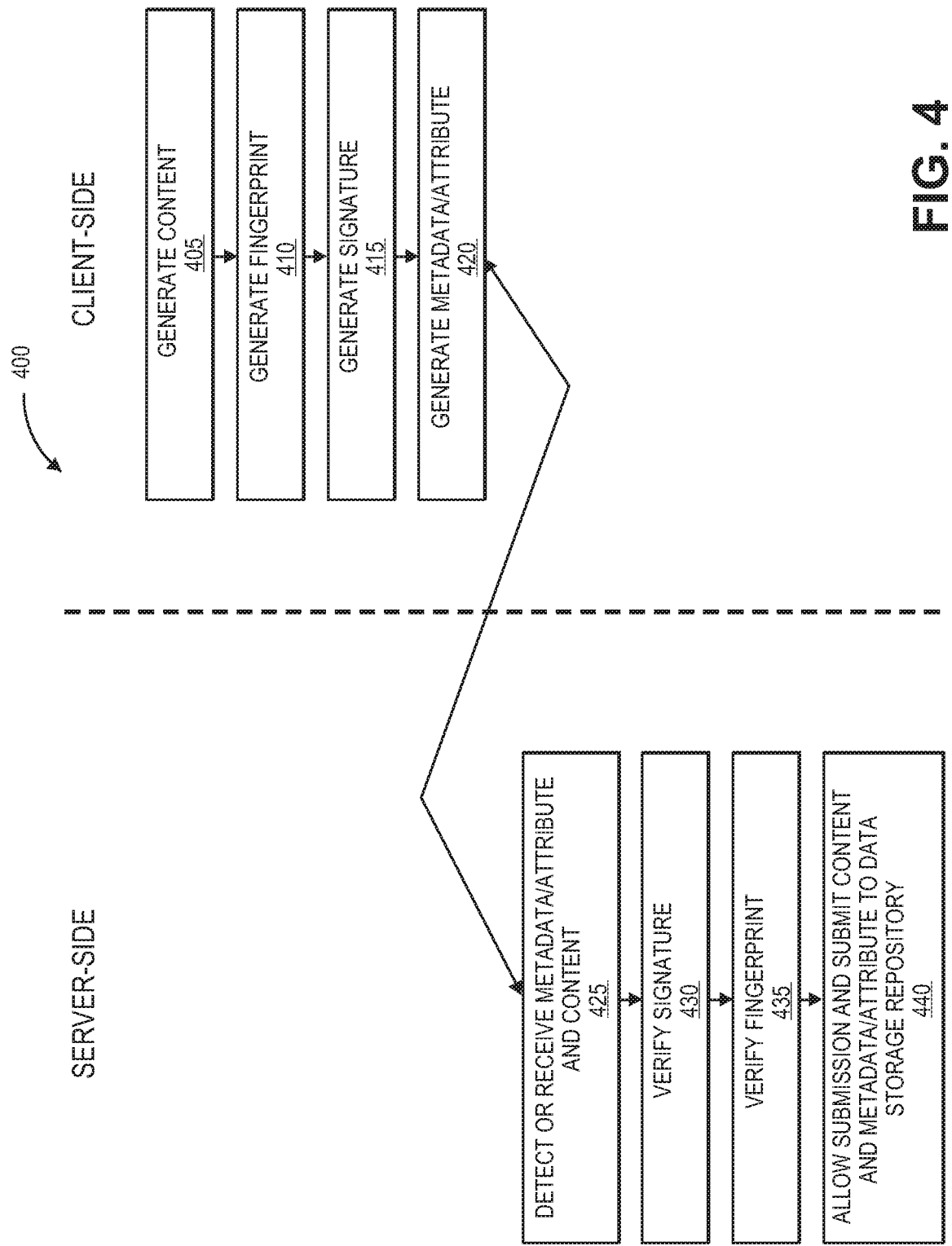
FIG. 4 illustrates a method for facilitating dynamic end-to-end integrity for data repositories according to one embodiment.

FIG. 4 illustrates a method 400 for facilitating dynamic end-to-end integrity for data repositories according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by protection mechanism 110 and protection application 240 of FIG. 2. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated hereafter.

Method 400 begins at block 405 on a client-side with generation of content (e.g., source code) by a user at a client computer, where the content represents or is placed into a content file which is to be assigned and submitted to a data storage repository. In one embodiment, upon generation of the content, a timestamp indicating generation of the content may be generated and associated with the content/content file. At block 410, a fingerprint identifying the content may be generated based on the content (e.g., using hash algorithm and portions of the content, etc.). The fingerprint may then be associated with the content/content file to identify the content. At block 415, a signature identifying the user (e.g., author of the content) may be generated using public/private keys associated with the user. The signature may then be associated with the user to identify the user. In one embodiment, at block 420, metadata is generated in which the signature, the fingerprint, and any other authorship data (e.g., user's name, identification number, etc.) may be placed. This metadata is associated with the content file and serves as an attribute to the content file.

Method 400 continues at block 425 on a server-side where the content and metadata may be detected or received by protection mechanism 110 of FIG. 2A for further processing. Upon accessing the metadata, the signature and the fingerprint are retrieved to be verified. At block 430 the signature associated with the user is verified based on the user's public key, proving the user's possession of the private key associated with the user and thus, the signature is verified to identify and authenticate the user. At block 435, the fingerprint associated with the content file is verified by, for example, verifying any hash value associated with the fingerprint and/or decoding the fingerprint to decipher the content and thus, the fingerprint is verified to identify and authenticate the content. In one embodiment, at block 440, upon verification of the signature and fingerprint, the content file and its attribute, the metadata, may be allowed to be submitted to the data storage repository. In one embodiment, the content and metadata are then submitted to the repository.

Figure 5:
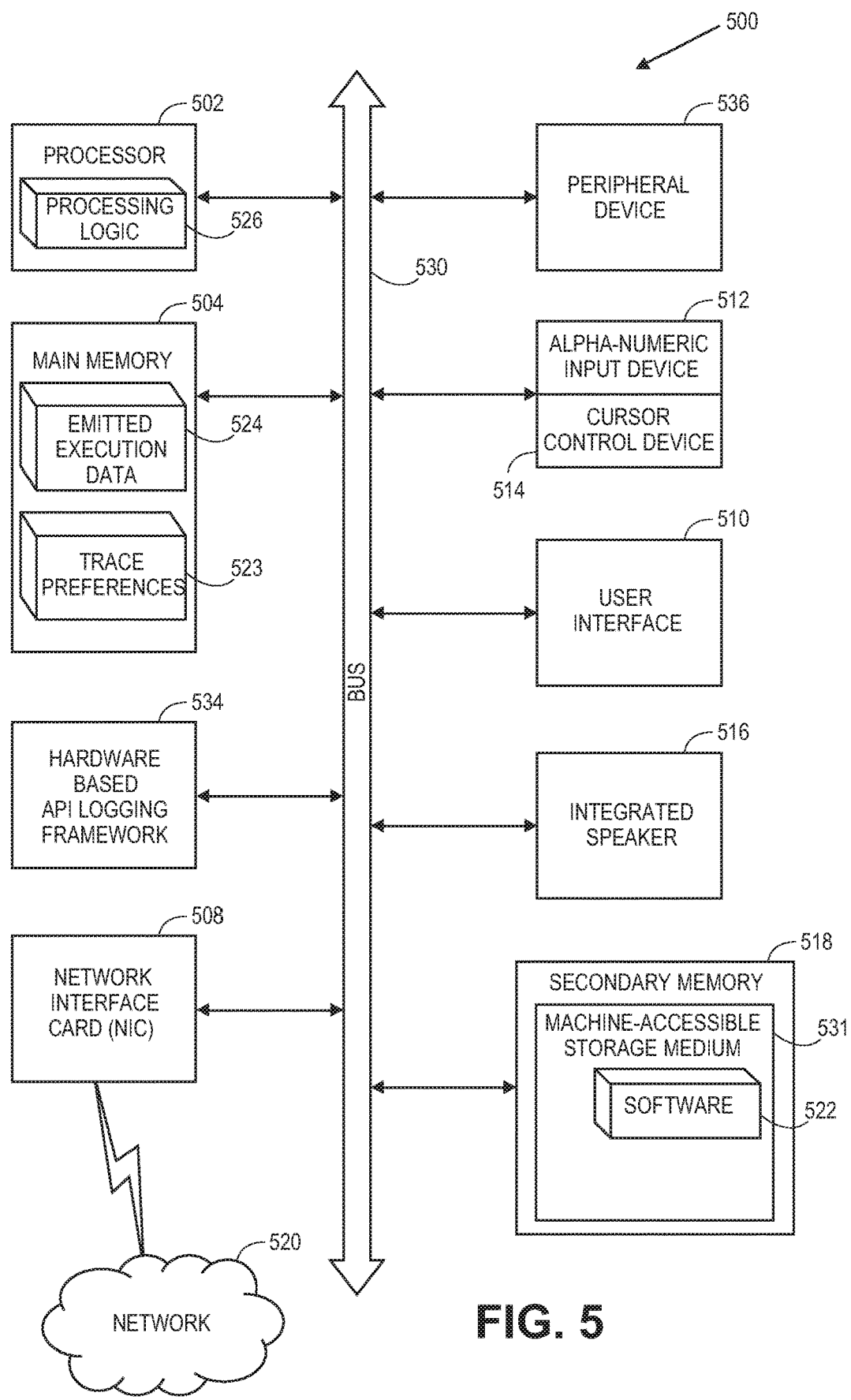
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 200 of FIG. 2), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic database table and customer query management mechanism 110 as described with reference to FIG. 1 other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of protection mechanism 110 as described with reference to FIG. 1 and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
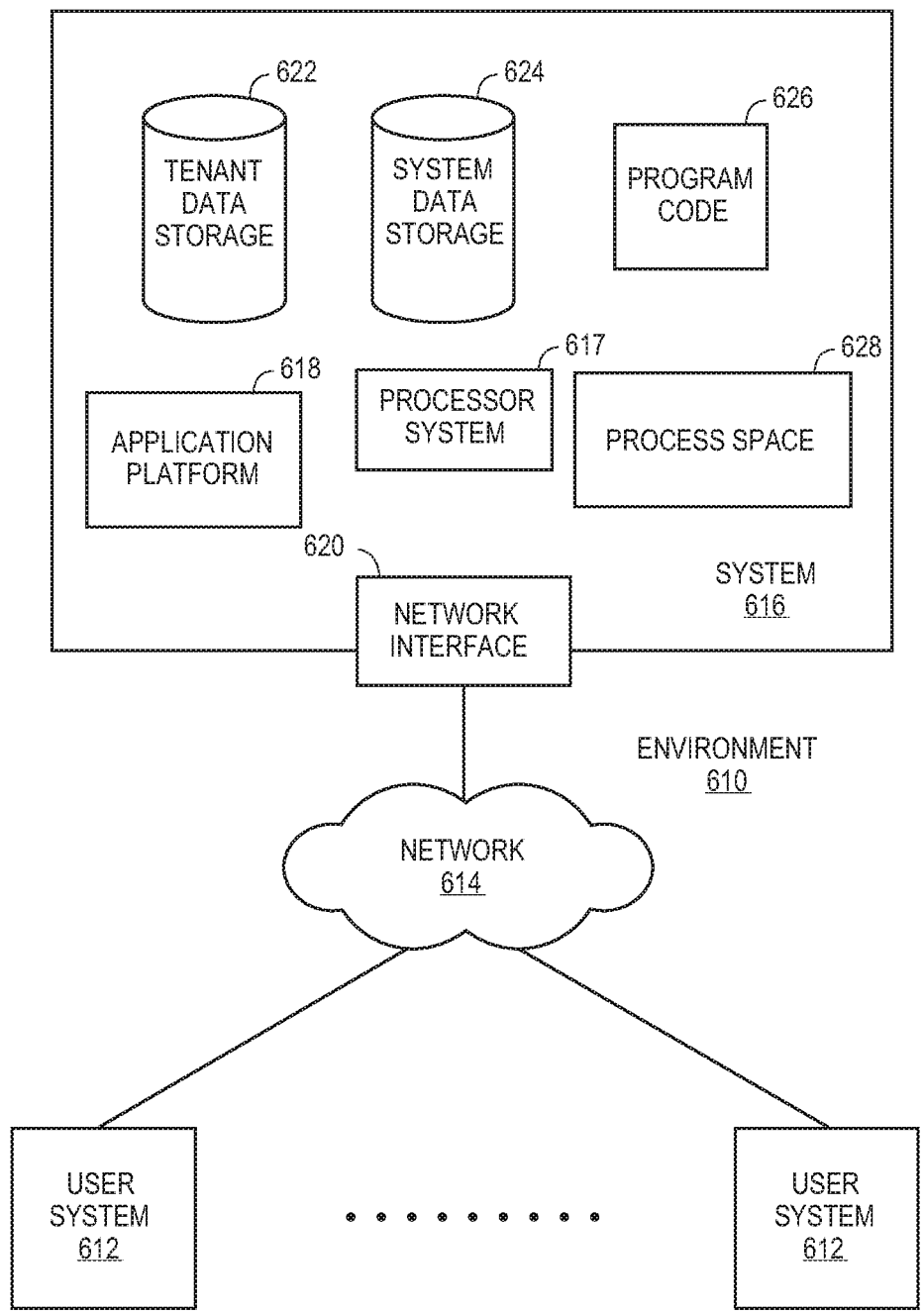
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
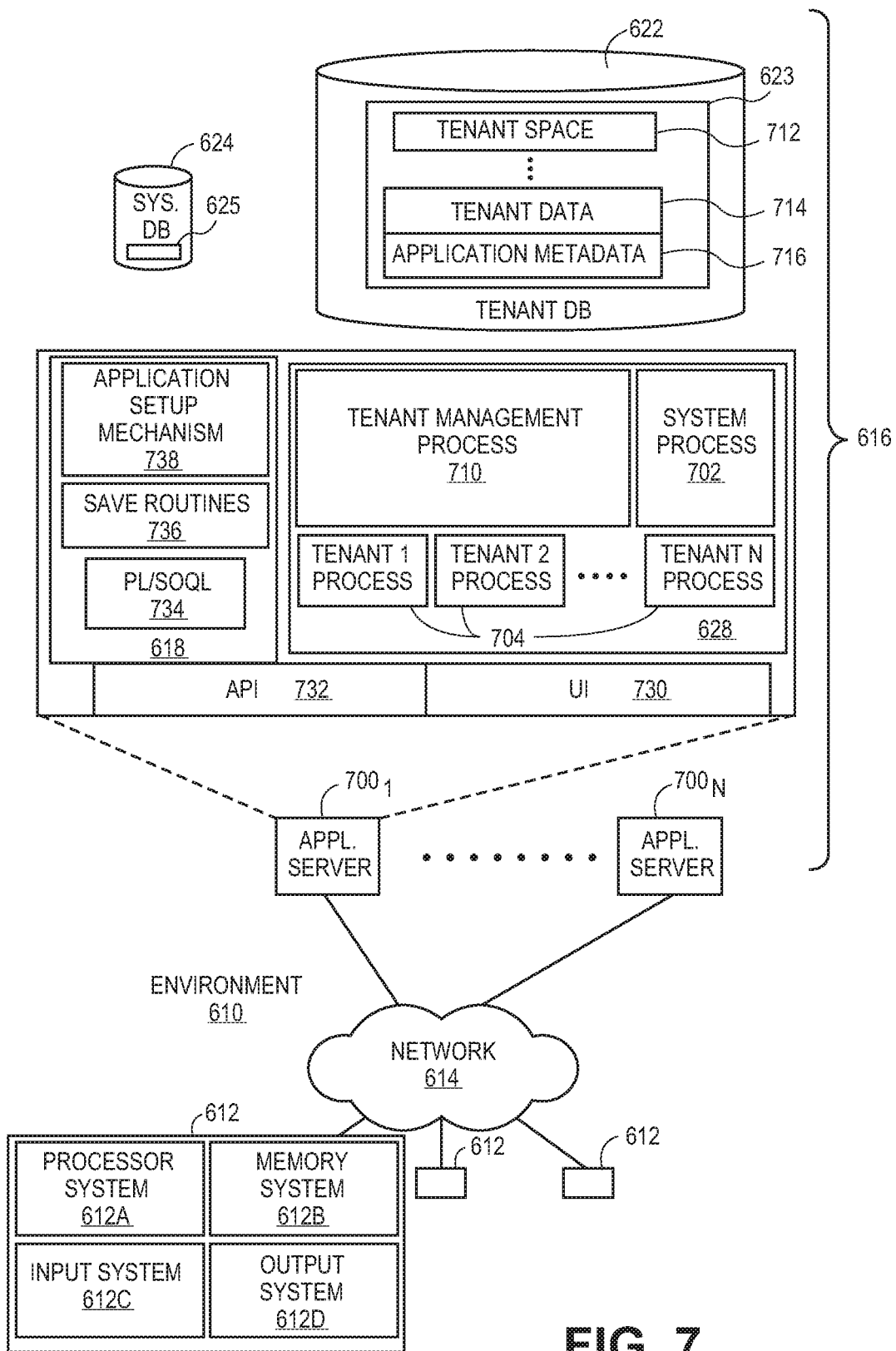
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A non-transitory computer-readable medium having stored thereon instructions which, when executed by a computing device, cause the computing device to facilitate operations comprising:
   detecting a file including contents verified by and associated with multiple integrity protocols including two or more of cryptographic signatures, digital fingerprints, public keys, private keys, timestamps, and authorship data, wherein the multiple integrity protocols are embedded in metadata attributes of the contents of the file, wherein the authorship data includes and is verified based on one or more identification credentials associated with the user;
   prior to preparing the file for communication to a data storage repository, identifying one or more origins of the file by tracing the embedded multiple integrity protocols, wherein the one or more origins are identified based on at least one of a source code or a development code associated with the file, wherein the one or more origins reference one or more computing devices or one or more authors responsible for generating at least a portion of the contents of the file, wherein the one or more origins and the embedded multiple integrity protocols are locally identified and traced without having to authenticate the file at one or more third-party verification devices;
   performing a two-prong verification check of the one or more origins of the file and the multiple integrity protocol associated with the contents of the file; and
   upon detecting success of the two-prong verification, communicating the file to the data storage repository, wherein the contents of the file are stored at the data storage repository.

2. The non-transitory computer-readable medium of claim 1, wherein the cryptographic signatures are generated using cryptographic keys and assigned to the metadata, wherein the one or more origins of the embedded multiple integrity protocols is based on one or more of a development code, a source code, a build and deploy system, a cryptography and protection system, a production and authentication device, a workstation, and a client computing device.

3. The non-transitory computer-readable medium of claim 1, wherein the digital fingerprints are generated based on hash values and assigned to the metadata.

4. The non-transitory computer-readable medium of claim 1, wherein the authorship data includes user credentials having one or more of a name of the user, an employee number of the user, and a birth date of the user.

5. The non-transitory computer-readable medium of claim 1, wherein the timestamps are generated by a third-party entity.

6. The non-transitory computer-readable medium of claim 1, wherein the metadata serves as an attribute to the content file, wherein upon submission to the data repository, the metadata remains associated with the content file.

7. A database system comprising:
   a server computer coupled to a data storage repository, the server computer to facilitate operations comprising:
   detecting a file including contents verified by and associated with multiple integrity protocols including two or more of cryptographic signatures, digital fingerprints, public keys, private keys, timestamps, and authorship data, wherein the multiple integrity protocols are embedded in metadata attributes of the contents of the file, wherein the authorship data includes and is verified based on one or more identification credentials associated with the user;

prior to preparing the file for communication to the data storage repository, identifying one or more origins of the file by tracing the embedded multiple integrity protocols, wherein the one or more origins are identified based on at least one of a source code or a development code associated with the file, wherein the one or more origins reference one or more computing devices or one or more authors responsible for generating at least a portion of the contents of the file, wherein the one or more origins and the embedded multiple integrity protocols are locally identified and traced without having to authenticate the file at one or more third-party verification devices;

performing a two-prong verification check of the one or more origins of the file and the multiple integrity protocol associated with the contents of the file; and upon detecting success of the two-prong verification, communicating the file to the data storage repository, wherein the contents of the file are stored at the data storage repository.

8. The database system of claim 7, wherein the cryptographic signatures are generated using cryptographic keys and assigned to the metadata, wherein the one or more origins of the embedded multiple integrity protocols is based on one or more of a development code, a source code, a build and deploy system, a cryptography and protection system, a production and authentication device, a workstation, and a client computing device.

9. The database system of claim 7, wherein the digital fingerprints are generated based on hash values and assigned to the metadata.

10. The database system of claim 7, wherein the authorship data includes user credentials having one or more of a name of the user, an employee number of the user, and a birth date of the user.

11. The database system of claim 7, wherein the timestamps are generated by a third-party entity.

12. The database system of claim 7, wherein the metadata serves as an attribute to the content file, wherein upon submission to the data repository, the metadata remains associated with the content file.

13. A method comprising:
detecting a file including contents verified by and associated with multiple integrity protocols including two or more of cryptographic signatures, digital fingerprints, public keys, private keys, timestamps, and authorship data, wherein the multiple integrity protocols are embedded in metadata attributes of the contents of the file, wherein the authorship data includes and is verified based on one or more identification credentials associated with the user;

prior to preparing the file for communication to a data storage repository, identifying one or more origins of the file by tracing the embedded multiple integrity protocols, wherein the one or more origins are identified based on at least one of a source code or a development code associated with the file, wherein the one or more origins reference one or more computing devices or one or more authors responsible for generating at least a portion of the contents of the file, wherein the one or more origins and the embedded multiple integrity protocols are locally identified and traced without having to authenticate the file at one or more third-party verification devices;

performing a two-prong verification check of the one or more origins of the file and the multiple integrity protocol associated with the contents of the file; and upon detecting success of the two-prong verification, communicating the file to the data storage repository, wherein the contents of the file are stored at the data storage repository.

14. The method of claim 13, wherein the cryptographic signatures are generated using cryptographic keys and assigned to the metadata, wherein the one or more origins of the embedded multiple integrity protocols is based on one or more of a development code, a source code, a build and deploy system, a cryptography and protection system, a production and authentication device, a workstation, and a client computing device.

15. The method of claim 13, wherein the digital fingerprints are generated based on hash values and assigned to the metadata.

16. The method of claim 13, wherein the authorship data includes user credentials having one or more of a name of the user, an employee number of the user, and a birth date of the user.

17. The method of claim 13, wherein the timestamps are generated by a third-party entity.

18. The method of claim 13, wherein the metadata serves as an attribute to the content file, wherein upon submission to the data repository, the metadata remains associated with the content file.

* * * * *